(12) United States Patent  (10) Patent No.: US 7,843,594 B2
Ferlitsch  (45) Date of Patent: Nov. 30, 2010

(54) SYSTEMS AND METHODS FOR WALKUP FILING USING REMOVABLE STORAGE

(75) Inventor: Andrew R. Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 965 days.

(21) Appl. No.: 11/673,381

(22) Filed: Feb. 9, 2007

(65) Prior Publication Data

US 2008/0195772 A1  Aug. 14, 2008

(51) Int. Cl.
G06F 15/00 (2006.01)
G06K 1/00 (2006.01)
G06K 15/00 (2006.01)
G06F 3/12 (2006.01)

(52) U.S. Cl. .................................. 358/1.16; 358/1.13

(58) Field of Classification Search .................. 358/1.1, 358/1.13, 1.14, 1.15, 1.16, 538, 539, 448, 358/426.07
See application file for complete search history.

(56) References Cited

U.S. PATENT DOCUMENTS

| 6,601,056 B1 | 7/2003 | Kagle et al. |
| 2002/0030836 A1 | 3/2002 | Motoyama |
| 2002/0120792 A1 | 8/2002 | Blair et al. |
| 2003/0095284 A1 | 5/2003 | Parry |
| 2003/0142334 A1 | 7/2003 | Currans et al. |
| 2003/0179112 A1 | 9/2003 | Parry et al. |
| 2004/0017590 A1 | 1/2004 | Dugas |
| 2004/0130746 A1 | 7/2004 | Wu |
| 2004/0220982 A1* | 11/2004 | Probert et al. ................ 707/205 |
| 2005/0044293 A1 | 2/2005 | Wu |
| 2005/0210209 A1 | 9/2005 | Nagata |
| 2007/0024884 A1 | 2/2007 | Yano et al. |
| 2008/0147790 A1* | 6/2008 | Malaney et al. .............. 709/203 |
| 2009/0254572 A1* | 10/2009 | Redlich et al. ................. 707/10 |

FOREIGN PATENT DOCUMENTS

| JP | 04205656 | 7/1992 |
| JP | 2004080627 | 3/2004 |
| JP | 2004110656 | 4/2004 |
| JP | 2006-133877 | 5/2006 |
| JP | 2006-253957 | 9/2006 |
| JP | 2007-037017 | 2/2007 |

* cited by examiner

*Primary Examiner*—Douglas Q Tran
(74) *Attorney, Agent, or Firm*—Austin Rapp & Hardman (57) ABSTRACT

A method for filing a data file from an imaging device using removable storage is described. A data file is received with a first format and a second format. A determination is made if the first format is a known format. A data converter is accessed to convert the first format to a known format if the first format is unknown. A determination is made if the second format is a known format. The data converter is accessed to convert the second format to a known format if the second format is unknown. The data file is filed to removable storage.

20 Claims, 11 Drawing Sheets

SYSTEMS AND METHODS FOR WALKUP FILING USING REMOVABLE STORAGE

TECHNICAL FIELD

The present invention relates generally to computers and computer-related technology. More specifically, the present invention relates to systems and methods for walkup filing using removable storage.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Printers are a type of imaging device. Imaging devices include, but are not limited to, physical printers, multi-functional peripherals, a printer pool, a printer cluster, a fax machine, a plotter, a scanner, a logical device, an electronic whiteboard, a tablet PC, a computer monitor, a file, etc. Jobs such as copying, scanning, etc. may be referred to as walkup jobs.

Different kinds of computer software facilitate the use of imaging devices. The computer or computing device that will be used to print the materials typically has one or more pieces of software running on the computer that enable it to send the necessary information to the printer to enable printing of the materials. If the computer or computing device is on a computer network there may be one or more pieces of software running on one or more computers on the computer network that facilitate printing.

Information or data that is to be sent to an imaging device may come from a variety of devices, including, but not limited to, removable storage devices. Removable storage devices for computing devices enable computer users to easily take electronic data from one place to another. Benefits may be realized by providing systems and methods for walkup filing using removable storage.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A method for filing a data file from an imaging device using removable storage is described. A data file is received with a first format and a second format. A determination is made if the first format is a known format. A data converter is accessed to convert the first format to a known format if the first format is unknown. A determination is made if the second format is a known format. The data converter is accessed to convert the second format to a known format if the second format is unknown. The data file is filed to removable storage.

In one embodiment, the first format is an input format and the second format is an output format. The imaging device may be a multi-functional peripheral (MFP) device. The data file may be converted from the input format to an intermediate format.

In one embodiment, the removable storage device comprises a Universal Serial Bus (USB) memory stick. A plurality of data files may be filed to removable storage as a single composed document. The removable storage device may be inserted into a local port connection on the imaging device.

In one embodiment, the determination if the first format is known is made from a group of: by reading a file suffix included with the data file, by reading an initial byte sequence of the data file, or explicitly indicated in the request. An interface for selection of a source of the data file may be provided. An interface for selection of a destination for the data file may also be provided. An interface for selection of an output format for the data file may further be provided.

An imaging device that is configured for filing a data file using removable storage is also described. The device includes a processor and memory in electronic communication with the processor. Instructions stored in the memory are executable to receive a data file with a first format and a second format, determine if the first format is a known format, access a data converter to convert the first format to a known format if the first format is unknown, determine if the second format is a known format, access the data converter to convert the second format to a known format if the second format is unknown and file the data file to removable storage.

A computer-readable medium comprising executable instructions for filing a data file from an imaging device using removable storage is also described. The instructions are executable to receive a data file with a first format and a second format, determine if the first format is a known format, access a data converter to convert the first format to a known format if the first format is unknown, determine if the second format is a known format, access the data converter to convert the second format to a known format if the second format is unknown, and file the data file to removable storage.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Removable storage for computing devices enables computer users to take electronic data from one place to another without requiring a more bulky computing device. There are many different kinds of removable storage media that can be used to store electronic data or information. One type of removable storage media is the USB (Universal Serial Bus) flash drive, sometimes referred to as a thumb drive or a memory stick. Most computers have USB ports, which allow memory sticks/USB flash drives to simply be plugged into the USB ports for access to the data that is stored on the memory stick/USB flash drive. Because USB ports and/or memory sticks/USB flash drives are so common, there are features that would be desirable that could be used in conjunction with a USB port and/or memory stick, such as walkup filing, where a data file may be stored to a USB memory stick from a multi-functional peripheral (MFP) device. More specifically, a user may file a data file from the MFP to the USB memory stick in a rasterized format, in a user selected output format, in an input format that is native (native) or non-native (unknown) to the MFP, in an output format that is native or non-native to the MFP and a selection of input formats and output formats that are non-native to the MFP.

One method of filing to removable storage may be demonstrated through the use of a client personal computer (PC) with a USB port. In this method, a user may connect a USB memory stick to the USB port and then browse to one or more files, either on the local PC or remotely, such as on a network drive. Once the user selects the file(s), the user may then copy the file(s) to the USB memory stick. However, this method still has limitations. The operation requires the user to be at a client PC. The operation does not support filing a document to a MFP. The filed document is in its original format, which may not be the user's desired format for transport (i.e., output format).

One improvement to the above method may be demonstrated through the use of a conversion driver. Like the above method, the user connects a USB memory stick to the USB port and then browses to the file(s) the user desires to file to the memory stick. Instead of filing the file(s) in their original format, the user first converts the files into the desired output format by opening the file in an application that supports the file format and then printing it to a conversion driver (e.g, PDF writer). The conversion driver then converts the file to the desired format. But, this method still has limitations. The operation requires the user to be at a client PC. The operation does not support filing a document from a MFP. The operation requires an application on the client PC that supports the original document format. The operation requires a conversion driver on the client PC that supports the desired output format. The operation requires the additional manual steps of opening the file in the application, and selecting print to the conversion driver.

Implementing an MFP as a conversion device is yet another method that has been used. In this method, the user sends the document to the MFP along with instructions to convert the document to a specified format. The MFP then converts the document to the user's specified format and sends it back to the client PC. Once received, the user would then copy the converted file to the USB memory stick. But this method has limitations. The operation requires the user to be a client PC. While this method uses an MFP, it does not support filing a document from an MFP (i.e., filed from the client PC). The MFP must support the original document format as a format native to the MFP. Further, with this method, the desired output format must be supported as an output format by the MFP.

The present systems and methods may provide benefits for walkup filing using removable storage. Walkup filing may indicate the user being present at an MFP to browse for a file and then store the desired file to a USB memory stick. For example, the present systems and methods may provide an effective method to execute a walkup filing job from an MFP to a removable storage, such as a USB memory stick. The exemplary operating environment includes an MFP that has filing functions. The MFP may also be communicatively coupled to a document server. Additionally, the MFP may be communicatively coupled to removable storage, such as a USB memory stick. In the present systems and methods, a user may perform a walkup filing job to a removable storage device (e.g., USB memory stick). Typically, the user would access the filing capability via the MFP's front panel. The front panel may allow the user to select filing settings that may include the source document to file, the destination device to file to and the output format of the filed document. The user may also select multiple documents to file, compose the documents as a composite filed document and choose documents from variety of input sources, both local and remote.

When the user initiates the operation, the MFP determines if either the original format or the output format are native (known) or non-native (unknown) to the MFP. If both are native, any processing and conversions of the document and output format are handled internally by the MFP. If either, or both, the original document or output formats are non-native, then the MFP may utilize an external translator for conversion services, in the most efficient manner, to complete the operation.

More specifically, when the user inserts a USB memory stick or accesses a document repository, and the MFP detects that one or more of the 'possible input' files are non-native, the MFP communicates with the external translator to obtain which non-native (e.g., application formats) the external translator has a translator for. These formats are then communicated back to the MFP. The MFP then enables the user to select these formats in addition to the native input formats. In addition, the MFP communicates with the external translator to obtain a list of output formats that the external translator can output. This list of non-native output formats may then be added to the list of native output formats from which the user may select an output format.

The exemplary operating environment includes multi-functional printers/products/peripherals (MFPs). Document generating devices and MFPs will be referred hereinafter as a device. In one embodiment, a device may include a copier, printer, scanner, facsimile machine (fax), media card reader, hard disk, etc. An MFP may take either hardcopy or softcopy input and produce a hardcopy (e.g., copy/print) or softcopy (e.g., scan/fax) output. The MFP additionally has one or more ports for accessing softcopy data from a removable media (e.g., USB memory stick). The MFP may additionally have internal filing storage.

Figure 1:
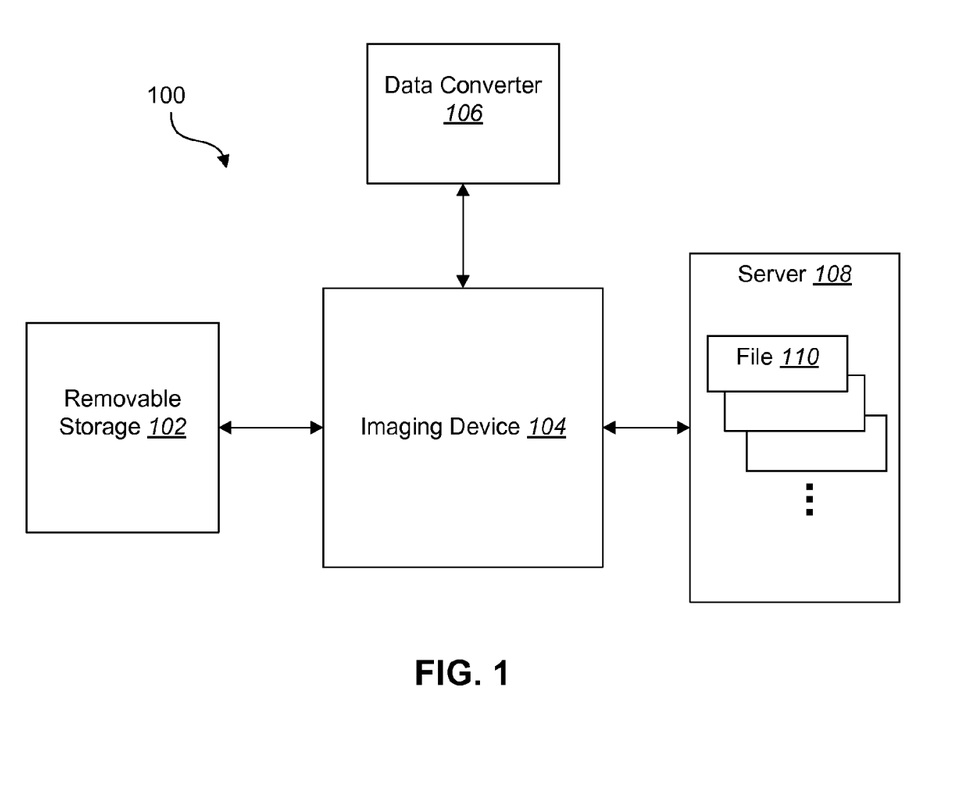
FIG. 1 is a block diagram illustrating an embodiment of a system for walkup filing using removable storage.

FIG. 1 is a block diagram illustrating an embodiment 100 for walkup filing using removable storage 102. A user may interface with an imaging device 104. In one embodiment, the imaging device 104 includes a control panel that provides the interface for the user. The user may browse files 110 stored on a server 108, where the server 108 may be embodied within the imaging device 104 or externally connected. The files 110 include a particular format. For example, some of the files may be in a portable document format (PDF) while other files may be in a tagged image file format (TIFF). The selected file 110 may be communicated to the imaging device 104. The user may also select the type of format desired for the storage of the file. For example, the user may desire for a file in a PDF format to be stored on the removable storage 102 as a file in a Joint Photographic Experts Group (JPEG) format. The original format of the file 110 (input format) may not be native (known) to the imaging device 104. Similarly, the output format desired by the user may not be native to the imaging device 104. As such, the imaging device 104 may access a data converter 106. The data converter 106 may be external to the imaging device 104 any may convert the input format and/or output format of the file 110. In other embodiments, the data converter 106 may be embodied with the imaging device 104, but separately from the imaging device as a guest service (e.g., virtual java machine).

Figure 2:
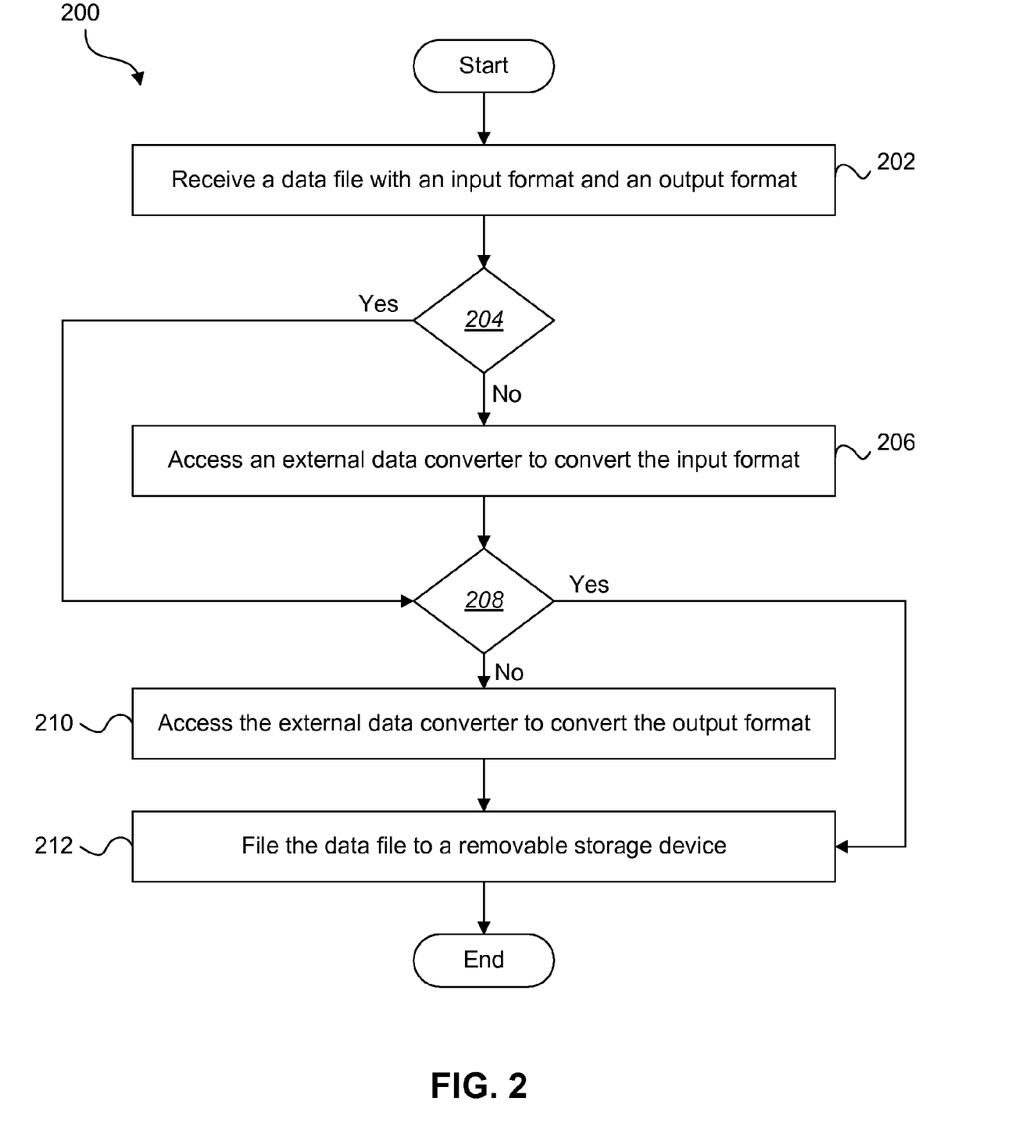
FIG. 2 is a flow diagram of an embodiment of a method for walkup filing using removable storage.

FIG. 2 is a flow diagram of an embodiment 200 of a method for walkup filing using removable storage 102. A data file is received 202 with an input format and an output format. In one embodiment, the imaging device 104 receives 202 the data file. The imaging device 104 may include an MFP. A determination 204 is made if the imaging device supports the input format. If the imaging device does not support the input format, an external data converter is accessed 206 to convert the input format. If the imaging device supports the input format, a determination 208 is made if the imaging device supports the output format. If the imaging device supports the output format desired by the user, the data file is filed 212 to a removable storage device. If it is determined 208 that the imaging device does not support the output format of the data file, the external data converter is accessed 210 to convert the output format and the data file is filed 212 to a removable storage device.

Figure 3:
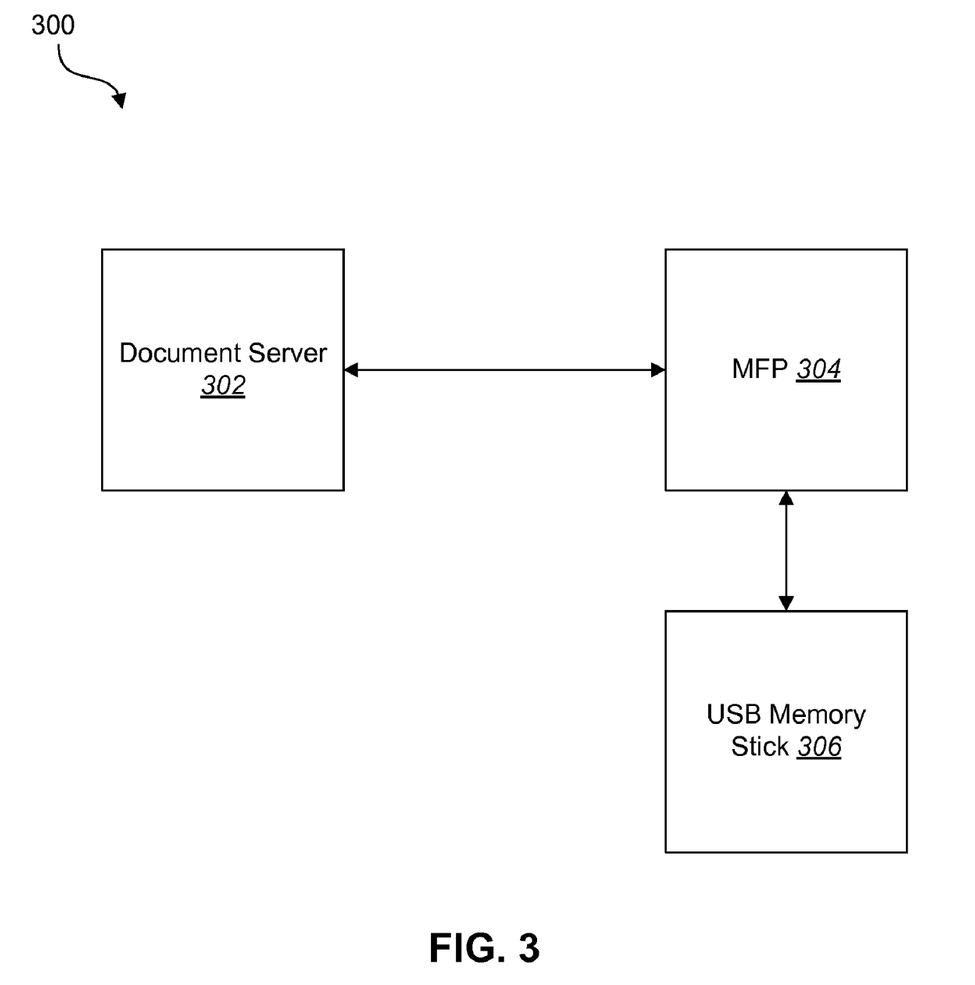
FIG. 3 is a block diagram illustrating one exemplary embodiment of an operating environment of the present systems and methods.

FIG. 3 is a block diagram illustrating one exemplary embodiment 300 of an operating environment of the present systems and methods. The exemplary operating environment includes a network, a locally or remotely connected multi-functional peripheral (MFP) device 304 with filing capability. The MFP may support other imaging capabilities such as copy, print, scan, format conversion, publishing device and fax. The MFP may access document inputs for filing from both local and remote sources. Local sources may include a hardcopy input from a scanner, internal filing storage and softcopy input from local ports (e.g., USB). Remote sources may include a file transfer protocol (FTP) pull from a document server 302, network file access from a network mounted file system and a document pull from the Internet. The MFP may also include input and output access to at least one form of removable storage 306. Examples of removable storage 306 may include a USB memory stick, floppy diskettes, compact discs (CD), digital versatile discs (DVD), removable hard-drives, etc.

Figure 4:
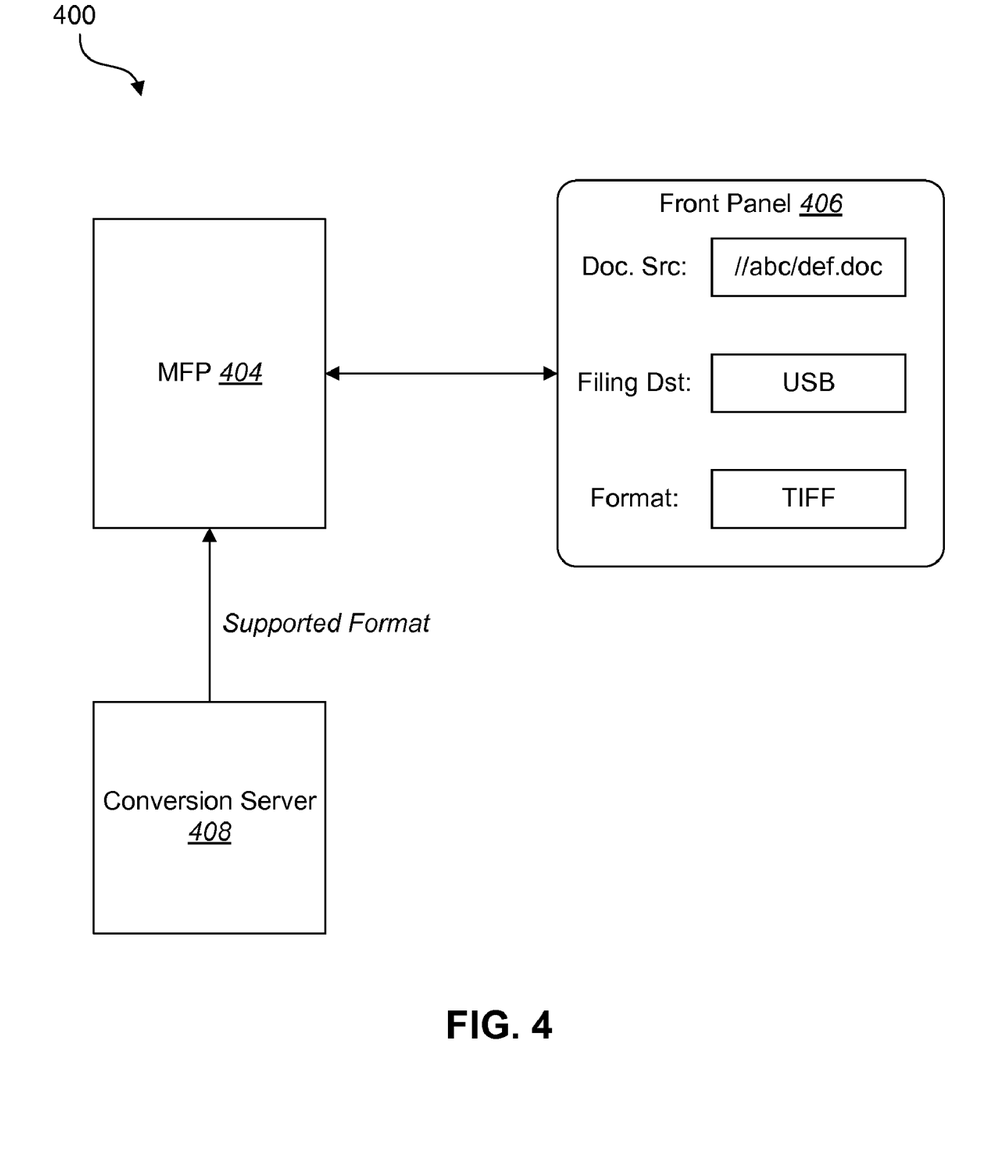
FIG. 4 is a block diagram illustrating one embodiment of an environment to initiate a filing job to removable storage.

FIG. 4 is a block diagram illustrating one embodiment 400 of an environment to initiate a filing job to removable storage. In one configuration, a user walks up to an MFP device 404 to perform a filing operation to removable storage (e.g., USB memory stick). The user initiates the filing operation via the MFP's operation front panel 406, which may be physically connected to the MFP 404. Alternatively, the front panel 406 may be a remotely connected to the MFP 404 such as a dynamically rendered front panel on a wireless device.

The front panel 406 may include several types of options and example settings. For example, the front panel 406 may include a document source option that may indicate the location of the file which is to be filed to removable storage. The document source may include internal filing storage, external storage, removable storage, network file system, FTP, email attachments, the Internet, hardcopy input from a scanner, facsimile data and other scanner sources (e.g., electronic whiteboard, digital camera). The front panel 406 may also include a filing destination. The filing destination may indicate the destination to which the file is to be filed. The filing destination may include internal filing, external storage, the Internet (i.e., publish) and removable storage. The front panel 406 may also include a filing format that may indicate the format in which the file is to be filed. Examples of filing formats settings may include raster, PDL, a portable document format (e.g., PDF, ODF), device independent image format (e.g., TIFF) and original document format. The front panel 406 may also include a composition option that allows the merging of multiple files into a single job, or the splitting of a file into separate jobs. The front panel 406 may also include a processing option. Examples of the processing option may include security marks, encryption, compression, OCR, paper/image size, etc.

In one embodiment, the user may select one or more source documents to file. If the user selects more than one document, the documents may be from the same storage source or from a variety of sources. The documents may also be of the same or mixed formats. Additionally, the user may optionally choose to do a composition filing. In one embodiment, a composition=OFF indicates the documents are filed as separated documents. In another embodiment, a composition=ON indicates the documents are filed as a single composed document. The user may also select a filing destination. In one embodiment, the filing destination is removable storage, such as a USB memory stick.

Additionally, the MFP 404 may allow the user to select input document formats that are otherwise non-native to the MFP 404 (i.e., the MFP 404 does not have an interpreter/translator for that particular input format). The MFP 404 may accomplish this by any means, such as querying a predetermined conversion server 408 (external translator) for a list of supported input formats for translation. This may occur statically, such as at startup or dynamically, such as each time a file to USB operation is initiated. Additionally, a request may be broadcast, or multicast, to the network for translators to respond with input formats for which they support a translation for.

In one embodiment, querying the external translators may include pre-registration of translator and supported formats in the MFP 404, SNMP query of the external translators and SOAP/XML Web Services. The MFP 404 may also allow the user to select output formats that are otherwise non-native to the MFP 404. The MFP 404 may accomplish this by any means, such as those previously described.

Once the MFP 404 has obtained the list of supported non-native input and output formats, the list is then incorporated in the MFP's 404 selection method (e.g., the front panel 406). This may be done by any means, such as internally merged within the MFP 404, externally merged, with a new screen sent from an external application to be displayed on the MFP 404.

Figure 5:
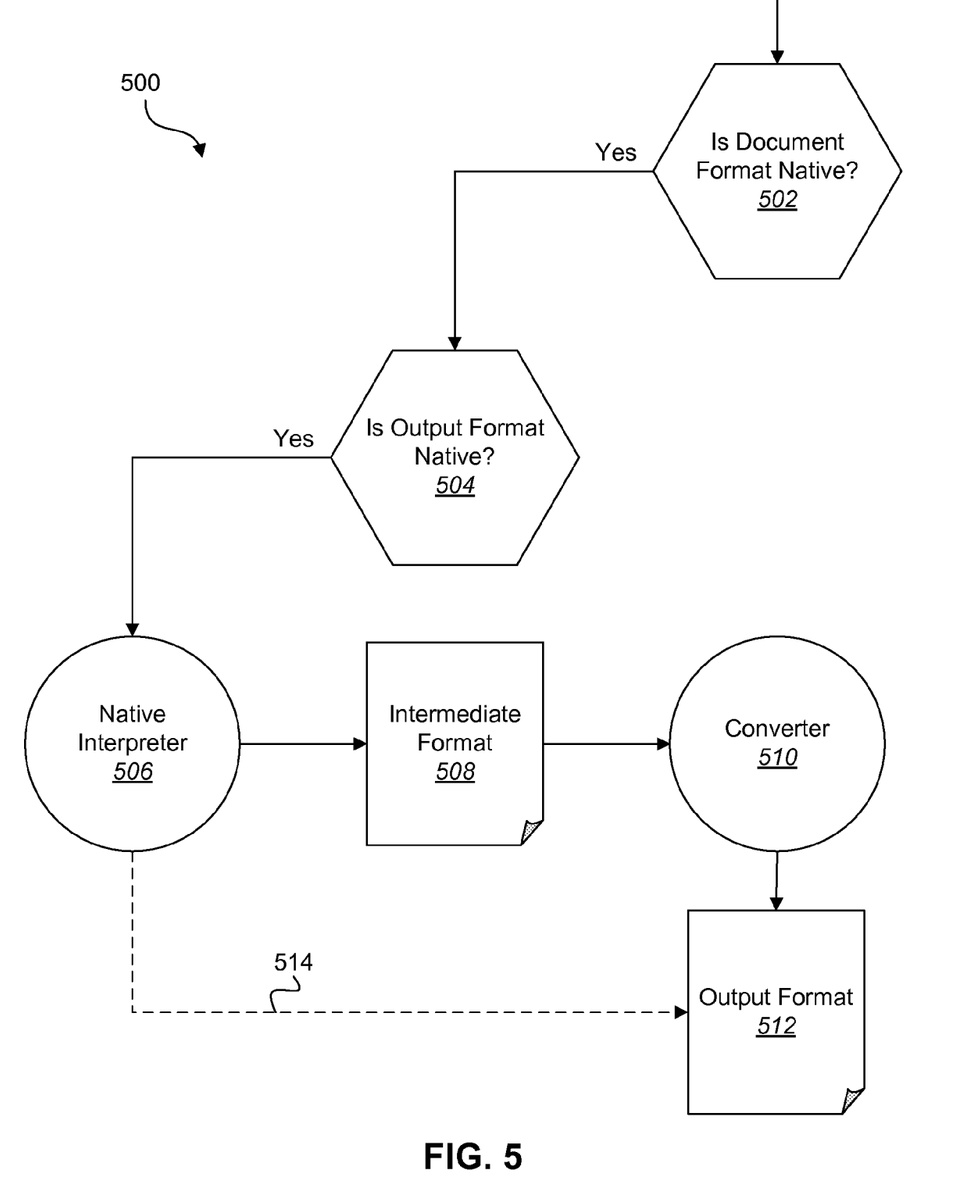
FIG. 5 is a flow diagram illustrating one embodiment of a method for executing a filing job when both the input format and the output format are native to the MFP.

FIG. 5 is a flow diagram illustrating one embodiment of a method 500 for executing a filing job when both the input format and the output format are native to the MFP. In one embodiment, the MFP may implement the method 500. In one embodiment, a determination 502 indicates that the format of the input document(s) is native to the MFP. A determination 504 further indicates that the selected output format is native to the MFP. The MFP may determine 502 whether the input formats are native by any means, such as implied from the file suffix, downloading the entire file and then examining the file contents for a format specific unique signature (e.g., signature in header), downloading an initial byte sequence (i.e., file header) and examining the initial sequence for a format specific unique signature, and passing the entire contents or initial byte sequence to an external translator service for determination.

Once it has been determined 502, 504 that both the input and output formats are native; the documents are then downloaded to the MFP, if they haven't already been downloaded. The MFP then interprets/processes 506 each document using a format specific interpreter. Upon completion of the processing 506, the interpreter converts 508 the document to an internal intermediate representation (e.g., Display List). The intermediate formatted documents are then passed to a format specific converter, which converts 510 the intermediate format to the output format 512.

In one embodiment, the documents may be composed into a single composed output filed document, such as by merging the documents while they are in the intermediate format, merging the documents after they have been converted to the output format, etc. In another embodiment, the conversion to an intermediate format may be skipped 514 if the MFP has a direct input to output format converter or the output and intermediate format are the same.

Figure 6:
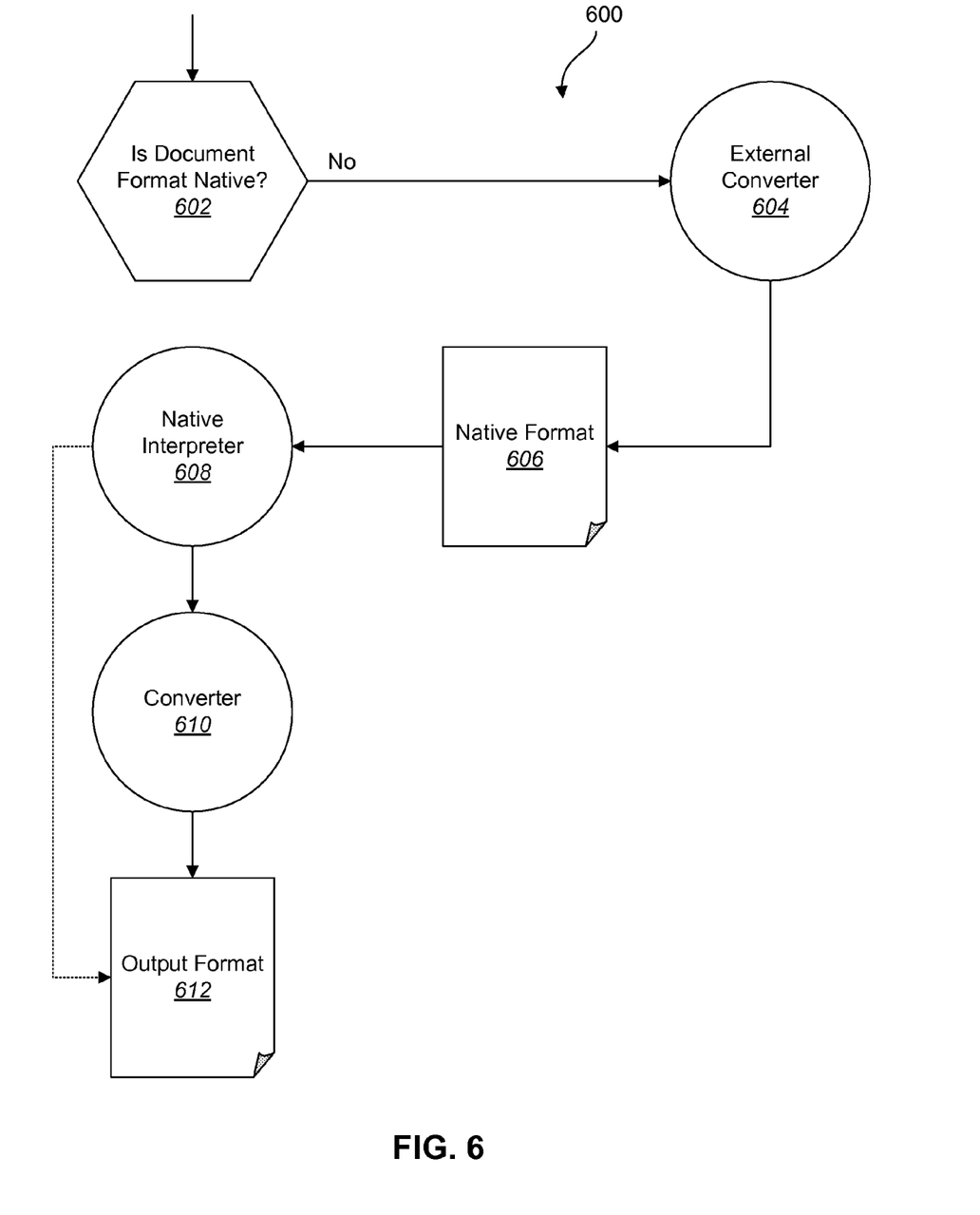
FIG. 6 is a flow diagram illustrating one embodiment of a method for executing a filing job when there is a non-native input and native output formats.

FIG. 6 is a flow diagram illustrating one embodiment of a method 600 for executing a filing job when there is a non-native input and native output formats. In one embodiment, the MFP determines 602 that while all the selected output formats are native to the MFP, at least one input format is non-native to the MFP. For each document whose input format is non-native to the MFP, the MFP uses an external translator service to convert 604 the document to a native format 606. The MFP may find the translation service by any means. For example, the translation service may be manually entered by the user, pre-registered by an administrator, dynamically registered by the translation service and dynamically discovered by the MFP. The MFP may also utilize more than one translation service for load distribution, different format-to-format translation services and cost basis. In one embodiment, the translation service may convert to any format that will be compatible with the MFP. For example, a format that is a native input format (e.g., PDL, TIFF, etc.) a format which is the output format (e.g., PDF, TIFF, etc.) a format which is the device's intermediate format (e.g., Display List). Additionally, the MFP may communicate by any means to the external translator. For example, if the external translator is physically separated, communication may occur over wired or wireless networks, using standard (e.g., TCP/IP, SOAP/XML Web Services, etc.) or proprietary protocols. If the translator is logically separated (e.g., running as a guest service), communication may be through inter-process communication (IPC) means.

The external translator may convert 604 the document by any means, such as through the use of a native interpreter 608 such as an application/driver. In one embodiment, the translator uses a format specific application to interpret the document and convert 610 it into a device independent graphical primitives (e.g., GDI). The device independent graphical primitives are then converted by a format specific driver into a format native to the MFP (e.g., TIFF driver). The external translator may convert 604 the document by direct format-to-format conversion that includes the translator using a direct format-to-format converter, such as a JPEG to TIFF converter.

A translation service may also be chained together, when no one service can (or otherwise available to) translate from the input format to the output format 612. In a chain, one translator translates the input format to a second format, which is then translated by another translator into a third format, and so on, until the desired format is achieved. The MFP may also decide to send only the document that needs an external translator, and translate the remaining documents internally, or send all the documents for translation. Finally, if the filing job is a composition job, the translated documents may be composed into a single composed document either at the MFP or again using an external service for composition.

Figure 7:
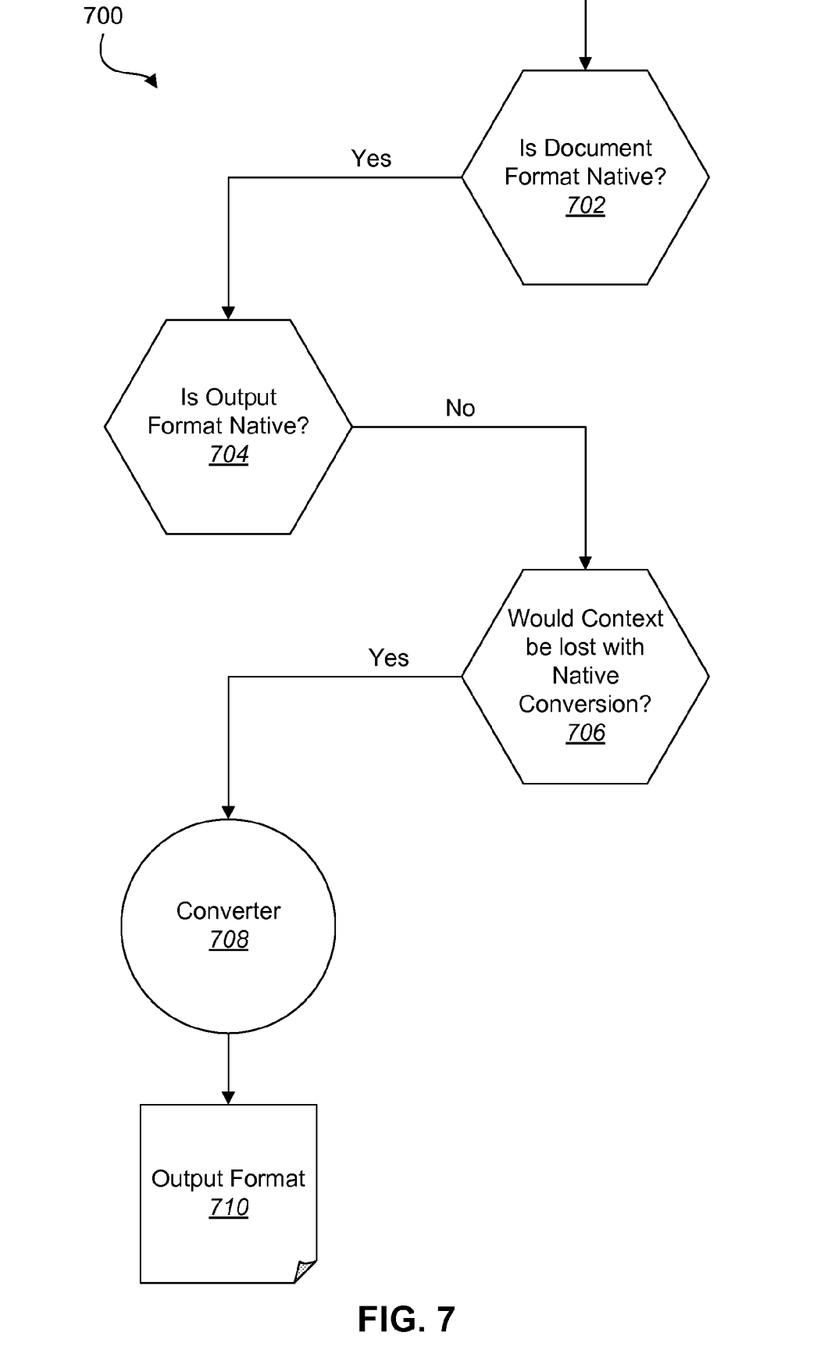
FIG. 7 is a flow diagram illustrating one embodiment of a method for filing a job when the input format is native but the output format is non-native to the MFP.

FIG. 7 is a flow diagram illustrating one embodiment of a method 700 for filing a job when the input format is native but the output format is non-native to the MFP. In one embodiment, the MFP determines 702 that while all the input formats are native to the MFP, the MFP determines 704 that at least one output format is non-native to the MFP. In this case, the MFP determines 706 if it can or cannot translate from an input format to an intermediate format, or wholly use an external translation service to convert 708 from the input format to the output format. Typically, the MFP would use an internal translation step if it reduces the overall workload, increases the output performance and/or achieves a higher level of quality. Typically, the MFP would not do an intermediate translation step if no translation service supports the intermediate format as input or if some context would be lost, that otherwise would not be lost by the external translator (e.g., textual meaning).

The documents, or the internal converted format, are then sent to the external translator for translation 708. As in above, the method 700 may send only the documents that need an output format 710 that is non-native, or all the documents. Translation, and optionally composition, is then performed as described previously.

Figure 8:
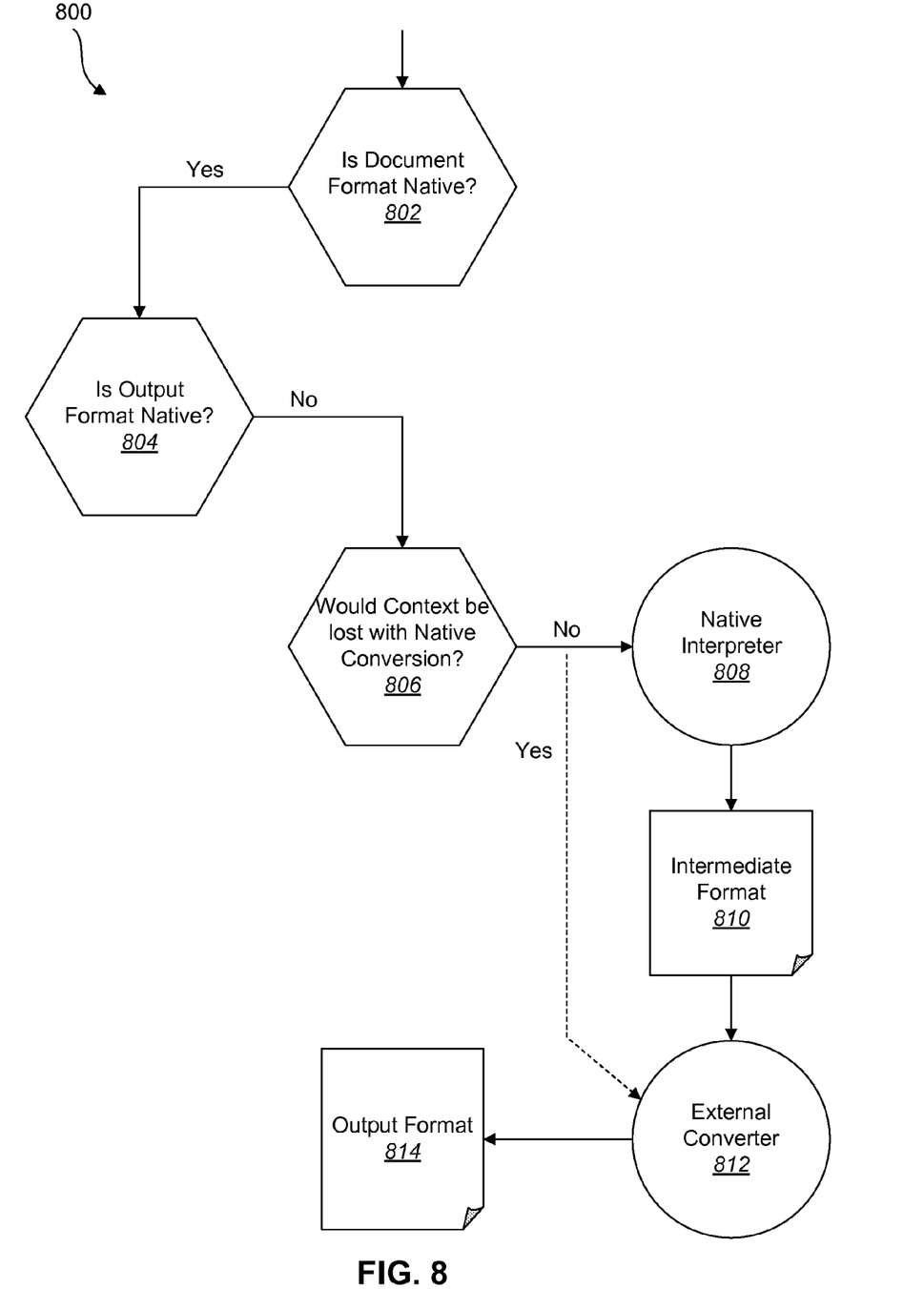
FIG. 8 is a flow diagram illustrating one embodiment of a method for filing a job when the input format is native but the output format is non-native to the MFP and an internal translation step is performed.

FIG. 8 is a flow diagram illustrating one embodiment of a method 800 for filing a job when the input format is native but the output format is non-native to the MFP and an internal translation step is performed. In one embodiment, the MFP determines 802 that while all the input formats are native to the MFP, the MFP determines 804 that at least one output format is non-native to the MFP. In this case, the MFP determines 806 if it can or cannot translate from an input format to an intermediate format, or wholly use an external translation service to convert 808 from the input format to the output format. As previously mentioned the MFP would use an internal translation step if it reduces the overall workload, increases the output performance and/or achieves a higher level of quality. As previously stated, the MFP would not do an intermediate translation step if no translation service supports the intermediate format as input or if some context would be lost, that otherwise would not be lost by the external translator (e.g., textual meaning).

If it is determined 806 that context would be lost with native conversion, the documents, or the internal converted format, are then sent to the external translator for translation 812. As in above, the method 800 may send only the documents that need an output format 814 that are non-native, or all the documents. Translation, and optionally composition, is then performed as described previously.

However, if it is determined 806 that context would not be lost with native conversion; the document is interpreted 808 by a native interpreter to an intermediate format 810. The document, in the intermediate format 810, is then passed to the external converter to be converted 812 to an output format 814.

Figure 9:
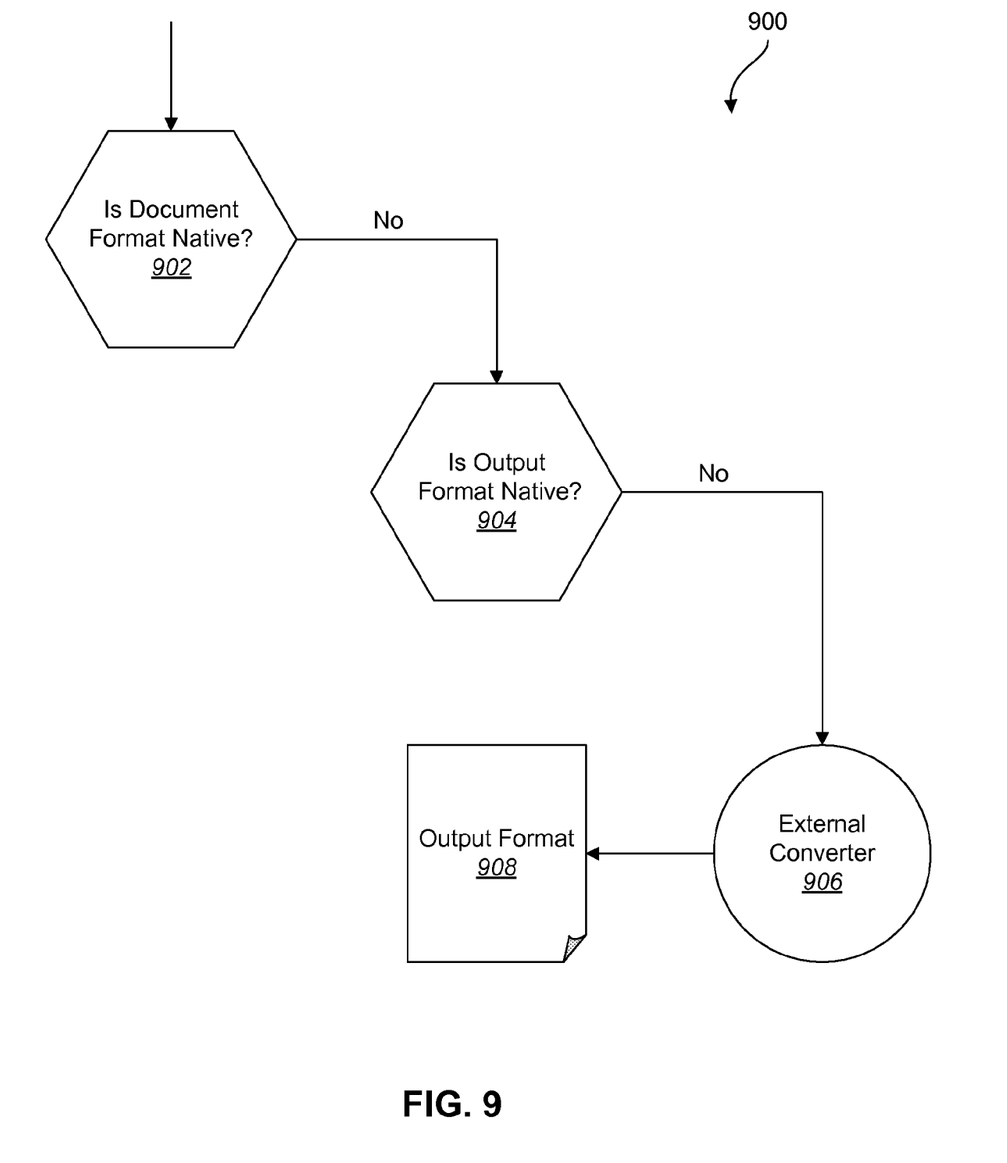
FIG. 9 is a flow diagram illustrating one embodiment of a method for implementing a filing job when both input and output formats are non-native.

FIG. 9 is a flow diagram illustrating one embodiment of a method 900 for implementing a filing job when both input and output formats are non-native. In one embodiment, the MFP determines 902 that at least one input format if non-native to the MFP. The MFP also determines 904 that at least one output format is non-native to the MFP. The MFP may either send the document whose input and output formats are non-native to the external translators, and retain the remainder for internal processing, or send all the documents to the external translator. The external translator then translates 906 the documents into the output format 908 and sends them back to the MFP, which then files the documents to the removable storage. If the user also selected composition, the MFP may also instruct the translators to send the converted documents to a composition service, or the MFP sends the converted documents, after being received, to the composition service.

While the embodiments discussed files stored on a USB memory stick, any type of removable storage may be used. Examples may include floppy, CD, DVD, removable hard-drive, wireless transfer to mobile device (laptop, cell phone, etc).

Figure 10:
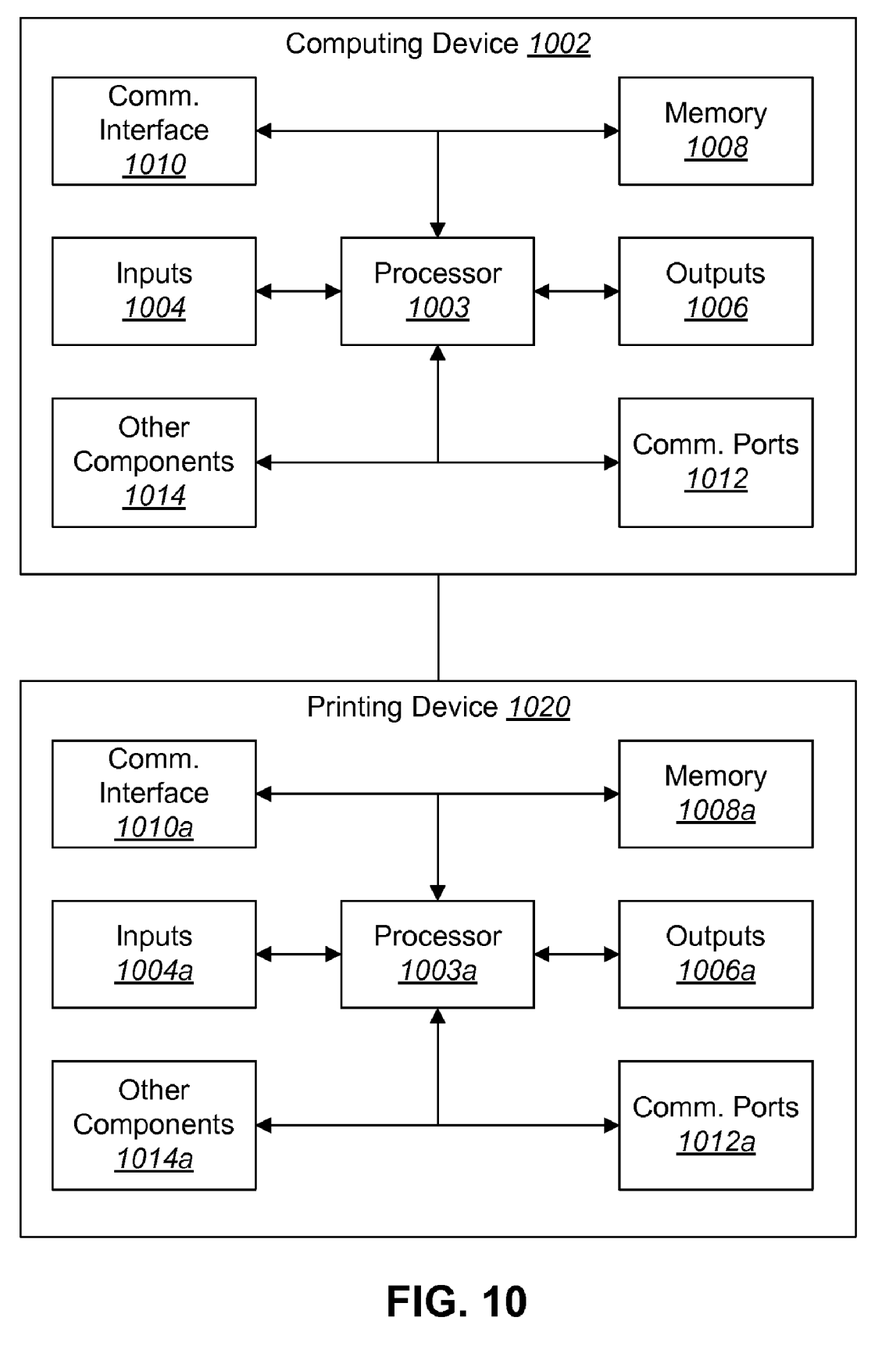
FIG. 10 is a block diagram illustrating the major hardware components typically utilized with embodiments herein.

FIG. 10 is a block diagram illustrating the major hardware components typically utilized with embodiments herein. The systems and methods disclosed may be used with a computing device 1002 and a printing device 1020, imaging device or MFP. The major hardware components typically utilized in a computing device 1002 are illustrated in FIG. 10. A computing device 1002 typically includes a processor 1003 in electronic communication with input components or devices 1004 and/or output components or devices 1006. The processor 1003 is operably connected to input 1004 and/or output devices 1006 capable of electronic communication with the processor 1003, or, in other words, to devices capable of input and/or output in the form of an electrical signal. Embodiments of devices 1002 may include the inputs 1004, outputs 1006 and the processor 1003 within the same physical structure or in separate housings or structures.

The computing device 1002 may also include memory 1008. The memory 1008 may be a separate component from the processor 1003, or it may be on-board memory 1008 included in the same part as the processor 1003. For example, microcontrollers often include a certain amount of on-board memory.

The processor 1003 is also in electronic communication with a communication interface 1010. The communication interface 1010 may be used for communications with other devices 1002, printing devices 1020, servers, etc. Thus, the communication interfaces 1010 of the various devices 1002 may be designed to communicate with each other to send signals or messages between the computing devices 1002.

The computing device 1002 may also include other communication ports 1012. In addition, other components 1014 may also be included in the computing device 1002.

Many kinds of different devices may be used with embodiments herein. The computing device 1002 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 10 is only meant to illustrate typical components of a computing device 1002 and is not meant to limit the scope of embodiments disclosed herein.

The computing device 1002 is in electronic communication with the printing device 1020, imaging device or MFP. A printing device 1020 is a device that receives or transmits an imaging job, such as a Multi-Function Peripheral ("MFP") or computing device. Printing devices include, but are not limited to, physical printers, multi-functional peripherals, a printer pool, a printer cluster, a fax machine, a plotter, a scanner, a copier, a logical device, a computer monitor, a file, an electronic whiteboard, a document server, etc. A typical printing device, such as a physical printer, fax machine, scanner, multi-functional peripheral or copier is a type of computing device. As a result, it also includes a processor, memory, communications interface, etc., as shown and illustrated in relation to FIG. 10. The printing device may be a single or a plural grouping (e.g., pool or cluster) of two or more devices.

Figure 11:
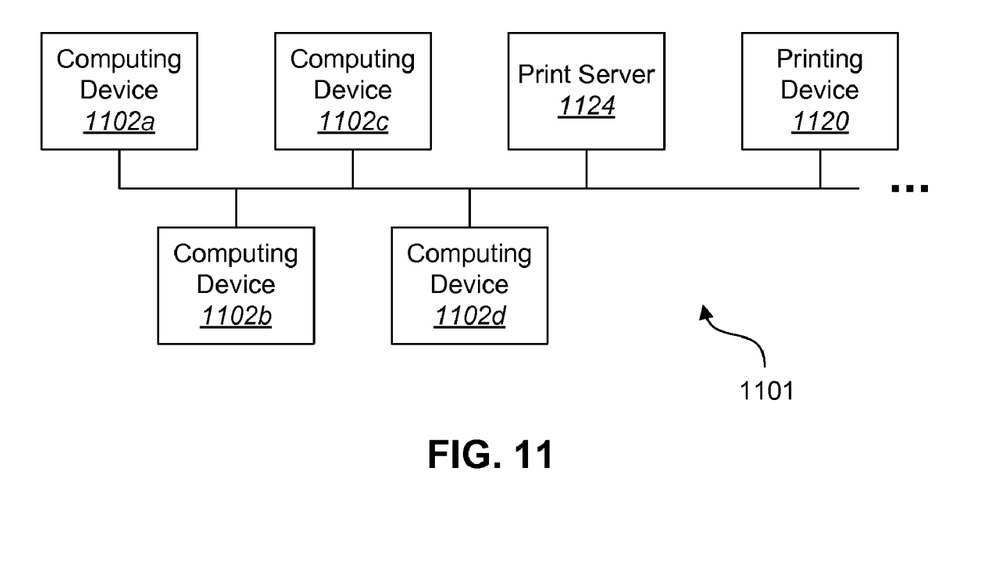
FIG. 11 is a network block diagram illustrating one possible environment in which the present systems and methods may be implemented.

FIG. 11 is a network block diagram illustrating one possible environment in which the present systems and methods may be implemented. The present systems and methods may also be implemented on a standalone computer system. FIG. 11 illustrates a computer network 1101 comprising a plurality of computing devices 1102, a printing device 1120 and a print server 1124. The network 1101 may include a local-area network (LAN), a wide-area network (WAN), a campus-area network (CAN), a metropolitan-area network (MAN), a home-area network (HAN), a client/server network, a peer-to-peer network, an application-server network, the Internet, a paging network, a wireless network, a token ring network, an Ethernet network, etc.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for filing a data file from an imaging device using removable storage, the method comprising:
 receiving a data file with a first format and a second format;
 determining if the first format is a known format;
 accessing a data converter to convert the first format to a known format if the first format is unknown;
 determining if the second format is a known format;
 accessing the data converter to convert the second format to a known format if the second format is unknown; and
 filing the data file to removable storage.

2. The method of claim 1, wherein the first format is an input format and the second format is an output format.

3. The method of claim 1, wherein the imaging device is a multi-functional peripheral (MFP) device.

4. The method of claim 1, further comprising converting the data file from the input format to an intermediate format.

5. The method of claim 1, wherein the removable storage device comprises a Universal Serial Bus (USB) memory stick.

6. The method of claim 1, further comprising filing a plurality of data files to removable storage as a single composed document.

7. The method of claim 1, further comprising inserting the removable storage device into a local port connection on the imaging device.

8. The method of claim 1, wherein the determination if the first format is known is made from a group of: by reading a file suffix included with the data file, by reading an initial byte sequence of the data file, or explicitly indicated in the request.

9. The method of claim 1, further comprising providing an interface for selection of a source of the data file.

10. The method of claim 1, further comprising providing an interface for selection of a destination for the data file.

11. The method of claim 1, further comprising providing an interface for selection of an output format for the data file.

12. An imaging device that is configured for filing a data file using removable storage, the imaging device comprising:
 a processor;
 memory in electronic communication with the processor;
 instructions stored in the memory, the instructions being executable to:
  receive a data file with a first format and a second format;
  determine if the first format is a known format;
  access a data converter to convert the first format to a known format if the first format is unknown;
  determine if the second format is a known format;

access the data converter to convert the second format to a known format if the second format is unknown; and file the data file to removable storage.

13. The imaging device of claim 12, wherein the imaging device is a multi-functional peripheral (MFP).

14. The imaging device of claim 12, wherein the first format is an input format and the second format is an output format.

15. The imaging device of claim 12, further comprising a Universal Serial Bus (USB) port.

16. The imaging device of claim 15, wherein the removable storage device is accessed through the USB port.

17. The imaging device of claim 12, wherein the instructions are further executable to file a plurality of data files to removable storage as a single composed document.

18. The imaging device of claim 12, wherein the determination if the first format is known is made from a group of: by reading a file suffix included with the data file, by reading an initial byte sequence of the data file, or explicitly indicated in the request.

19. The imaging device of claim 12, further comprising an interface for selection of a destination for the data file.

20. A computer-readable medium comprising executable instructions for filing a data file from an imaging device using removable storage, the instructions being executable to:

receive a data file with a first format and a second format;

determine if the first format is a known format;

access a data converter to convert the first format to a known format if the first format is unknown;

determine if the second format is a known format;

access the data converter to convert the second format to a known format if the second format is unknown; and file the data file to removable storage.

* * * * *